April 14, 1959            G. A. HOLT            2,881,743
INTERNAL COMBUSTION ENGINES OF THE LIQUID FUEL
INJECTION COMPRESSION IGNITION TYPE
Filed Dec. 19, 1957
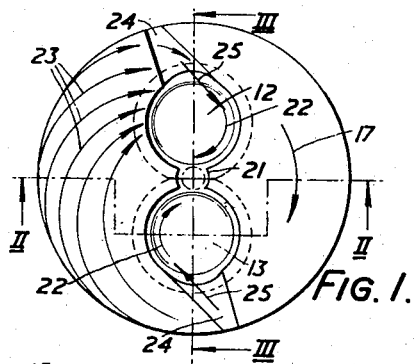
FIG. 1.
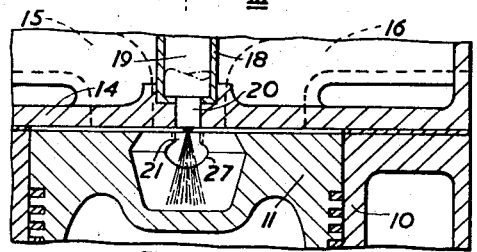
FIG. 2.
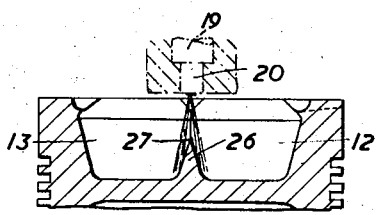
FIG. 3.
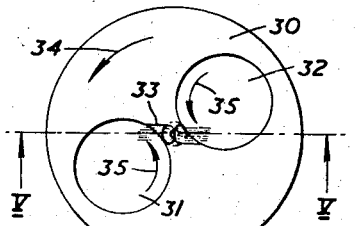
FIG. 4.
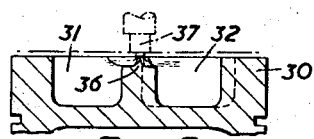
FIG. 5.
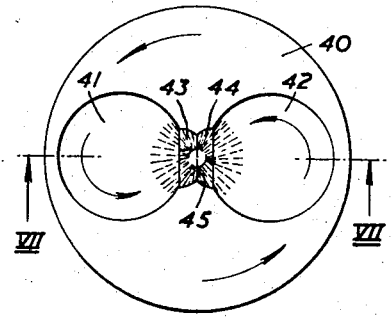
FIG. 6.
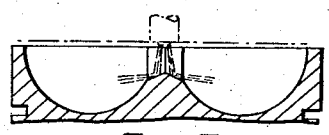
FIG. 7.
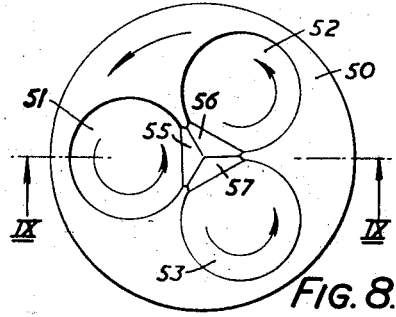
FIG. 8.
FIG. 9.
INVENTOR
GEORGE A. HOLT
BY
Watson, Cole, Grindle & Watson
ATTORNEY

United States Patent Office 2,881,743
Patented Apr. 14, 1959

2,881,743

INTERNAL COMBUSTION ENGINES OF THE LIQUID FUEL INJECTION COMPRESSION IGNITION TYPE

George Allen Holt, Shoreham-by-Sea, England, assignor to Ricardo & Co., Engineers (1927) Limited, London, England, a British company Application December 19, 1957, Serial No. 703,793

Claims priority, application Great Britain December 20, 1956

15 Claims. (Cl. 123—32)

This invention relates to internal combustion engines of the liquid fuel injection compression ignition type.

Engines of the above type in common use have various different forms of combustion chambers and disposition and type of fuel injection devices, one of the main objects of each arrangement being to bring the largest possible proportion of the air charge into contact with the fuel jet or jets during the combustion process and thus provide for satisfactory engine performance.

The main desirable qualities in engines of the liquid fuel injection compression ignition type may be summarised as (1) the ability to use as high a proportion of the air available in the combustion chamber as possible, (2) good fuel economy, (3) exhaust cleanliness, (4) good starting, (5) flexibility and efficiency of performance over a wide speed range and (6) smoothness of operation, and although many forms of combustion chambers as at present in use have a combination of some of these desirable qualities to a reasonably high degree, no form of combustion chamber at present in use appears capable of providing all the desirable qualities to a satisfactorily high degree.

The present invention resides in a modification of the main invention described in copending U.S. application, Serial No. 703,803, according to which the piston and cylinder of a liquid fuel injection compression ignition engine are so formed as to provide between the piston and cylinder head at the end of each compression stroke at least two approximately similar combustion pockets, so disposed that at the end of the compression stroke the air charge compressed into each pocket is in a state of approximately similar movement, and the engine includes means for injecting fuel approximately similarly into the air charge in each pocket.

Now according to the present invention an engine of the kind referred to comprises a piston and cylinder so formed as to provide between the piston and cylinder head at the end of each compression stroke at least two approximately similar pockets, communicating with one another, and so disposed that at the end of the compression stroke the air charge compressed into each pocket is in a state of approximately similar movement, and means for injecting fuel approximately similarly into the air charge in each pocket comprising a single injection nozzle arranged to direct a jet or spray of fuel on to a deflecting or dividing surface or surfaces, by which the fuel is divided or deflected into each of the pockets.

The references above to the air charge compressed into each pocket being in a state of approximately similar movement and to the means for injecting fuel approximately similarly into the air charge in each pocket are to be understood as meaning that, taking each pocket separately and without reference to its position in relation to other parts, the general type of air movement in each pocket will be approximately the same and the characteristics of the fuel injection and the direction or directions of such injection (after impingement on the dividing or deflecting surfaces) in relation to the containing surface of the pocket and to the movement of the air therein, will be approximately the same for each pocket, at least during normal load running, although in some cases there may be minor variations mainly effective for example under starting, idling or low load running conditions. In other words the arrangement will be such that substantially similar combustion conditions exist in each pocket. The term air movement is used herein to include organised movement, that is to say movement in a particular pattern of flow, for example rotational or torroidal movement, or a combination of these two types of movement, as well as any other such movement as has the object of bringing as much as possible of the available air in the pocket into contact with fuel to produce as complete burning of the latter as possible during the combustion process.

The pockets conveniently communicate with a common space at their adjacent points in which space the deflecting or dividing surface or surfaces are positioned, and adjacent or within which space the end of the fuel injection device lies at the end of each compression stroke. In most cases each of the pockets will be of approximately circular cross-section in planes normal to the cylinder axis and in this event the common space may be provided either by causing the circles representing the circumferential surfaces of the pockets to overlap somewhat or by providing an intermediate depression lying between and communicating with the adjacent parts of the pockets.

In any case where, as is preferred, each pocket is of approximately circular cross-section in planes normal to its axis of symmetry the arrangement will preferably be such that at the end of each compression stroke a substantial degree of organised rotation of the air charge in each pocket and approximately about the axis of the pocket takes place, during the period of fuel injection. Thus the invention may be applied to an engine of the kind in which, during the induction period, the air charge enters the cylinder in such a manner that the air charge rotates bodily about the cylinder axis at the end of the induction period, this rotation persisting during the compression period and causing rotation of the air charge in each of the pockets at the end of the compression stroke. Organised rotation of the air charge in each pocket may, however, be augmented by special formation of the piston face or cylinder head such as to tend to cause a greater part of the air forced into each pocket during the compression stroke and more particularly by the close approach of the piston to the cylinder head at the end of each compression stroke to enter the pockets in directions which are approximately tangential to circles having the axes of the pockets for centre. To this end appropriate shallow channels might be formed in the piston face or cylinder head.

Where such bodily rotational movement of the air charge in each pocket occurs at the end of each compression stroke the fuel injection means is preferably so disposed and formed in conjunction with the deflecting surface or surfaces as to direct fuel in a jet with the axis of the jet in a direction having a substantial component in the direction of rotational movement of the part of the air charge in the pocket adjacent to the injection means (that is to say in a "downstream" direction).

Where there are two combustion pockets the deflecting surfaces may be constituted by the two sides of the ridge-like formation on the part of the piston crown between the pockets. Similarly where there are three pockets the deflecting surfaces may be formed by the sides of a three-sided pyramidal formation on the part of the piston crown between the pockets. It will be understood that the deflecting surfaces may be formed to give to the fuel jet a desired direction in relation to the air movement in each pocket, for example a downstream direction to the fuel deflected by each of them into its associated pocket when the air rotates bodily in each pocket.

Where, as will in many cases be preferred, a single fuel injection device is provided, this may be formed so as to deliver a number of jets corresponding to the number of pockets, each jet being directed appropriately with regard to its respective deflecting surface, or the injector nozzle may be of the pintle type designed to produce a hollow conical fuel jet.

Thus in one arrangement where there are two or three pockets symmetrically arranged with respect to the cylinder axis, a central fuel injection device may be provided formed so as to deliver respectively two or three jets or a conical jet, each jet or part of the jet after deflection by the deflecting surface having such a direction in relation to the direction of rotation of the air charge in its pocket that the fuel injection is substantially downstream and approximately tangential to a circle concentric with the circumferential wall of the pocket, and of smaller radius than the wall of the pocket.

Some of the advantages of the invention are, (1) By dividing the total quantity of air which is to be brought into contact with the fuel injected into two or more similar bodies each in a pocket of similar form and having similar air movement characteristics, it is more readily possible to control the distribution of fuel in the air than where a single pocket of at least twice the volumetric dimensions is employed.

(2) It is well known that for any given rotational air speed generated in the cylinder during the induction or air charging period the rotational speed of the air charge when transferred into a single combustion chamber pocket varies somewhat inversely as the diameter of the pocket. When two or more combustion chamber pockets are employed the diameter of each is appreciably less than that of a single pocket and consequently it is more readily possible to attain the desired rotational speed of the air charge in each of the combustion chamber pocket whereby an efficient combustion process is obtained with the use of a single fuel jet disposed in each pocket without resorting to an excessively high velocity of the air stream through the inlet valves, thus enabling a higher engine volumetric efficiency to be obtained and consequently a greater useful operating speed range and a higher maximum power output.

(3) Since the combustion pockets communicate with one another by overlapping or by providing a communicating space between their adjacent parts, a single fuel injection device which may be centrally disposed, or nearly so, in the cylinder head, as is usually convenient, can be employed while yet enabling satisfactory distribution in the air without excessive injection pressure and with a number of jets corresponding only to the number of pockets or with a single jet arranged to impinge upon deflecting surfaces which direct the appropriate proportions of fuel correctly into the various pockets.

The invention may be performed in various different ways but some specific embodiments will now be described by way of example with reference to the accompanying drawings in which Figure 1 is a plan view of one form of piston according to the invention;

Figure 2 is a fragmentary sectional side elevation on the line 2—2 in Figure 1 of the upper part of this piston mounted within a cylinder, the upper part of the cylinder and cylinder head only being illustrated for convenience;

Figure 3 is a sectional end elevation through the same piston on the line 3—3 in Figure 1;

Figures 4 and 5 are respectively a plan view and a sectional side elevation on the line 5—5 of a modified form of piston, the cylinder and cylinder head being omitted for convenience;

Figures 6 and 7 are views similar to Figures 4 and 5 of a further modification, section 7 being taken on the line 7—7 in Figure 6, and Figures 8 and 9 are also views similar to Figures 4 and 5 of yet another modified form of piston, section 9 being taken on the line 9—9 in Figure 8.

In the construction illustrated in Figures 1, 2 and 3 the engine comprises a cylinder 10 in which is arranged to reciprocate a piston 11 having a flat crown in which are formed two combustion pockets 12 and 13. The cylinder is closed by a cylinder head 14 containing inlet and exhaust ducts 15, 16 terminating in ports opening into the cylinder and controlled by poppet valves in generally known manner. The disposition and form of the inlet passage 15 and its port are such in relation to the bore of the cylinder that in known manner the air charge entering the cylinder through the inlet port during each induction period is caused to rotate about the cylinder axis in the manner indicated by the arrow 17 in Figure 1. The cylinder head 14 is provided with a built-in housing 18 for a fuel injection device 19 of known type having a pintle nozzle 20 which is arranged to direct a jet or spray of fuel of generally conical form downward substantially along the axis of the cylinder.

The two combustion pockets 12 and 13 are symmetrically positioned on opposite sides of the cylinder axis. As illustrated clearly in Figures 2 and 3 each pocket is of double frusto-conical form when viewed in section and the distance between the axes of symmetry of the two pockets is somewhat less than the diameter of each pocket at its widest part. Although the lower ends of the two pockets are distinct and separate surfaces of revolution the main envelopes of the side walls of the pockets thus overlap towards their upper ends and the pockets are in communication with one another adjacent their upper ends. A passage 21 is also provided between the two pockets at their extreme upper ends adjacent the flat crown of the piston, and it will be noted that apart from this passage 21 the "mouth" or upper end of each pocket is of appreciably smaller diameter than the maximum diameter of the pocket.

As will be seen from Figure 1 the rotation of the air in the cylinder as indicated by the arrow 17, will, at the end of each compression stroke when substantially the whole of the air charge has been forced into the pockets 12 and 13, cause the air charge in each pocket to be in a state of rotation as indicated by the arrows 22. The air charge rotating bodily within the cylinder bore may be regarded as entering the pockets at the end of the compression stroke in the general direction of arrows 23. To assist in creating the required rotational movement within each pocket the piston crown is provided with two grooves 24 each of which runs into one of the pockets 12, 13 from the circumferential edge of the piston crown with a substantially tangential component of direction. Each groove increases progressively in depth and width from its outer end to its inner end where it enters the pocket. These grooves tend to cause the high velocity circumferential portion of the air charge rotating within the cylinder to enter the pockets 12, 13 tangentially as indicated by the arrows 25 during the compression stroke. They also cause an appreciable proportion of the rotating air charge which is rapidly displaced from the cylinder space into the pockets towards the end of the compression stroke to be caused to enter the pockets 12, 13 tangentially as indicated by the arrows 27, and thus appreciably increase the rate of bodily rotation of the air charge in each pocket about the axis of the pocket.

As will be seen clearly from Figure 3 the double frusto-conical form of the two pockets and the overlapping relationship between the upper parts of their side walls results in the formation of a ridge 26 between the pockets, this ridge having an upper curved edge 27 which extends transversely across a plane containing the axes of the two pockets. As previously mentioned the fuel injection nozzle 20 is arranged to direct a conical fuel jet downwards along the axis of the cylinder and this fuel jet is thus divided by the edge 27 of the ridge 26, part of the jet impinging on each of the ridge surfaces which constitutes guiding or dividing surfaces and from which the fuel is directed into the respective pockets.

In the construction illustrated in Figures 4 and 5 the piston 30 is formed in its upper surface with two spaced combustion pockets 31, 32 each of generally cylindrical form with their lower ends rounded off as illustrated in Figure 5. The main envelopes of the cylindrical side surfaces of these pockets are distinct and non-overlapping, but the pockets communicate with one another via a communicating passage 33, which is of approximately semicircular cross-section. The passage 33 is substantially straight and inclined to a plane containing the axes of the two pockets, thus entering each pocket in a substantially tangential direction. Where the general direction of rotation of air within the cylinder is as indicated by the arrow 34 the circulation of air within each pocket is in the direction of the arrows 35 and the communicating passage 33 is so disposed that fuel entering each pocket along the passage has a component of direction which is downstream in relation to the circulation of air within each pocket.

At the centre of the length of the passage 33 there is provided a ridge formation 36 extending upwards from the lower surface of the passage transverse to the length of the passage. In this example the fuel injection nozzle 37 is substantially identical with the nozzle 20 of the previous example and is arranged to direct a substantially conical jet of fuel downwards along the cylinder axis. The fuel jet impinges on the inclined side surfaces of the ridge formation 36 and on the lower surfaces of the passage 33 and the fuel is divided and deflected into the two pockets.

In the form of piston illustrated in Figures 6 and 7 the crown of the piston is formed with two hemispherical pockets 41, 42. The envelopes of the spherical surfaces of these pockets are distinct and non-overlapping but the pockets communicate with one another via an interconnecting passage having two part spherical surfaces 43, 44, these surfaces having a junction of the circular edge 45 which is transverse to a plane containing the axes of symmetry of the pockets. As in the previous examples a fuel injection nozzle 46 of the pintle type is arranged to direct a conical fuel jet downwards on to the ridge 45 and the spherical inclined surfaces 43, 44 on either side of the ridge. The fuel jet is thus divided and deflected into the two pockets.

In the piston construction illustrated in Figures 8 and 9 the piston 50 is formed with three combustion pockets 51, 52, 53 equally spaced about the cylinder axis. Each pocket is of generally hemispherical form and the spherical side surfaces are distinct and non-overlapping, but the pockets communicate with one another through a common central space 54. The lower surface of this central space is of three sided pyramid form including three inclined part-spherical surfaces 55, 56, and 57. A fuel injection nozzle 58 of the pintle type, mounted in the cylinder head, is arranged to direct a conical jet of fuel downwards on to this pyramid formation from which the fuel is divided and deflected into the three pockets.

What I claim as my invention and desire to secure by Letters Patent is:

1. An internal combustion engine of the liquid fuel injection compression ignition type comprising a piston and cylinder so formed as to provide between the piston and cylinder head at the end of each compression stroke at least two approximately similar communicating combustion pockets, so disposed that at the end of the compression stroke the air charge compressed into each pocket is in a state of approximately similar movement, inclined inpingement surfaces between said pockets, and means for injecting fuel approximately similarly into the air charge in each pocket comprising a single injection nozzle arranged to direct a jet of fuel on to the impingement surfaces by which the fuel is divided or deflected into each of the pockets.

2. An internal combustion engine as claimed in claim 1 in which the impingement surfaces include a ridge and inclined surfaces extending from the ridge towards the respective pockets, the fuel jet being arranged to impinge at least partly on these inclined surfaces.

3. An internal combustion engine as claimed in claim 1 in which the surfaces of the pockets so formed are substantially complete surfaces of revolution, the axis of symmetry of each pocket being parallel to the axis of the cylinder, but the side walls of the pockets overlap one another when viewed in a direction parallel to the axis of the cylinder.

4. An internal combustion engine as claimed in claim 1 in which the envelopes of the main side walls of the pocket are distinct and non-overlapping and the pockets communicate with one another through an intermediate passage, the impingement surfaces being formed in the wall of this passage.

5. An internal combustion engine as claimed in claim 4 in which the surfaces of the pockets so formed are substantially complete surfaces of revolution, the axis of symmetry of each pocket being parallel to the axis of the cylinder and in which the distance between the axes of symmetry of any two pockets is appreciably greater than the sum of the radii of curvature of the two pockets at their parts of maximum diameter.

6. An internal combustion engine as claimed in claim 1 in which the injector nozzle is of the pintle type arranged to project the jet or spray of fuel in a generally conical form.

7. An internal combustion engine as claimed in claim 1 in which each pocket is of part spherical form.

8. An internal combustion engine as claimed in claim 1 in which each pocket is formed substantially wholly in the piston and the cross-sectional area of the pocket is reduced at a point adjacent the crown of the piston to form a restricted mouth or neck.

9. An internal combustion engine as claimed in claim 1 in which the pockets are symmetrically positioned about the cylinder axis and are of the same size and shape.

10. An internal combustion engine as claimed in claim 1 including grooves formed in the piston crown extending inwards from adjacent the outer circumferential wall of the cylinder to communicate with each pocket.

11. An internal combustion engine as claimed in claim 10 in which each groove enters the pocket in a direction substantially tangential to the side wall of the pocket.

12. An internal combustion engine as claimed in claim 1 in which the cylinder head and piston are formed to provide three pockets of similar size and shape equally positioned angularly about the cylinder axis.

13. An internal combustion engine as claimed in claim 12 in which the three pockets are formed by depressions in the crown of the piston and the deflector surface is in the form of a three sided pyramid lying between the pockets with its apex lying adjacent the cylinder head and three inclined side walls extending towards the respective pockets.

14. An internal combustion engine as claimed in claim 1 in which the fuel injection nozzle and the deflector surface or surfaces are so arranged that the fuel is introduced into each pocket in a direction which is generally downstream in relation to the direction of air flow within the pocket at the end of the compression stroke.

15. An internal combustion engine as claimed in claim 14 in which the direction of fuel injection into each pocket is substantially tangential to a circle concentric with the side wall of the pocket and of somewhat smaller radius than the pocket.

References Cited in the file of this patent

UNITED STATES PATENTS 1,662,553     Wilking  ---------------- Mar. 13, 1928